3,363,029
AMINE AND AMMONIUM SALTS OF ALLYLIC ESTERS OF STYRENE/MALEIC ANHYDRIDE POLYMERS AS STABILIZER IN AQUEOUS POLYMERIZATION PROCESSES
Joseph A. Verdol, Dolton, and Bob G. Gower, Park Forest, Ill., and Henry H. Rueter, Decatur, Ga., assignors to Sinclair Research, Inc., New York, N.Y., a corporation of Delaware
No Drawing. Filed Nov. 24, 1965, Ser. No. 509,626
18 Claims. (Cl. 260—885)

The present invention relates to emulsion or suspension polymerization of water-soluble amine and ammonium salts of allylic esters of styrene-maleic anhydride polymers with polymerizable monomers.

Polymer emulsions prepared in accordance with the present invention, show excellent stability, small particle size, excellent gloss and water resistance when applied in finished form as coatings. The polymers isolated from such emulsions are highly insoluble in common organic solvents and display significant infrared absorption for anhydride, ester and carboxylic acid groups, showing the incorporation of the styrene-maleic anhydride allylic ester in the polymer. Emulsion systems prepared in accordance with the present invention are of potential commercial interest in the formulations of floor polishes, water-based latex paints, binders for nonwoven fabrics, paper coatings and textile sizes.

In the process of the present invention, the amine or ammonium salt of the allylic ester of the styrene-maleic anhydride polymer is not only one of the monomers in the polymerization but also acts as the principle emulsifying or suspending agent and as a protective colloid.

The allylic esters, the amine or ammonium salts of which constitute one of the monomers of the invention are the polymer esters of polymers of styrene and maleic anhydride and an allylic monohydric alcohol (including the ether allyl alcohols or allyloxymonohydric alcohols) of 3 to 30 carbon atoms, preferably 3 to 15 carbon atoms. The polymer esters of the invention, hereinafter referred to as styrene-maleic anhydride esters, can be essentially full or partial esters although the polymers are often partial esters containing large proportions of mono-esters, that is, anhydride groups which have opened and only one carboxylic group of which has been esterified. There also may be present to a considerable extent some diester as well as monoester and some unbroken anhydride groups. The percentage of esterification in the polymer esters of the invention can range from about 2 to 200%, preferably 20 to 90%, based on the half-ester. The average molecular weight of styrene-maleic anhydride allylic ester generally ranges from about 500 to 15,000 or more, preferably about 700 to 8000.

The allylic alcohols employed to form the polymer esters include allyl alcohols represented by the structure:

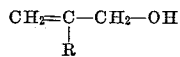

wherein R is hydrogen, alkyl, aryl, halogen, C≡N or other non-interfering substituents. Illustrative of allyl alcohols of the above structure are allyl alcohol, methallyl alcohol, 2-propylallyl alcohol, 2-pentylallyl alcohol, 2-phenylallyl alcohol, 2-chloroallyl alcohol, 2-cyanoallyl alcohol and the like.

Another group of allylic alcohols that may be used is the allyloxymonohydric alcohols, preferably the allyloxylower alkanols. Representative of allyloxymonohydric alcohols include those having the structure:

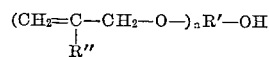

wherein R″ is hydrogen or a hydrocarbon of 1 to 25 carbon atoms, R′ is a hydrocarbon of 2 to 30 carbon atoms, preferably 2 to 15 carbon atoms and n is 1 to 3. R″ and R′ can be saturated or unsaturated and are preferably alkyls. Illustrative of alcohols of this group are β-allyloxyethanol, di- and tri-allyl ethers of pentaerythritol and the allyl ethers of trimethylolpropane. Other suitable ethers of allyl alcohols include those having the formula:

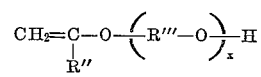

wherein R″ is as defined above, R‴ is a hydrocarbon of 1 to 4 carbons and x is 2 to 25, preferably 2 to 4. Examples of these alcohols are the allylic alcohols oxyalkylated with at least 1 mole of an alkylene oxide of 1 to 4 carbon atoms per mole of allylic alcohol.

The polymer resins of styrene and maleic anhydride, with which the allylic alcohols are reacted to provide the styrene-maleic anhydride allylic ester of the invention, are resinous polymers having about 1 to 4 moles, preferably 1 to 3 moles of styrene per mole of maleic anhydride. The polymer contains repeating styrene and maleic anhydride units and has an average molecular weight of at least about 400 up to about 15,000 or more. The melting point of the styrene-maleic acid copolymers generally ranges from about 80 to 300° C. as determined by the Fisher-Johns Melting Point Apparatus. The average molecular weight of the styrene maleic anhydride copolymer and the styrene-maleic anhydride allyl alcohol esters is determined by the thermoelectric differential vapor pressure method (VPΔ).

The polymer of styrene and maleic anhydride can be prepared by various methods. A preferred method is solution polymerization where the monomers are polymerized employing as a polymerization catalyst, a free-radical catalyst, such as benzoyl peroxide or dicumyl peroxide, at a temperature of about 75 to 300° C. or more. Suitable solvents include the aromatic hydrocarbon solvents such as cumene, p-cumene, xylene, toluene, etc. and ketonic solvents such as methylethylketone.

Typical properties of styrene-maleic anhydride base resins from which the ammonium or amine salts can be prepared are as follows:

TABLE I

| Resin | I | II | III | IV | V |
|---|---|---|---|---|---|
| Form | Powder | Powder | Powder | Powder | Powder |
| Average Molecular Weight | 1,600 | 1,700 | 1,900 | 400-600 | 7,000-10,000 |
| Melting Range, °C | 165-180 | 140-160 | 115-130 | 80-100 | 200-235 |
| Acid No | 500 | 366 | 275 | 400 | 500 |
| Kinematic Vis. at 30° C. (in acetone 10% conc.) | 0.67 | 0.73 | 0.78 | 0.5 | 2.3 |
| Ratio of Styrene to Maleic Anhydride in Polymer | 1:1 | 2:1 | 3:1 | 1:1 | 1:1 |

The styrene-maleic anhydride allylic esters can be prepared by reacting the allyl alcohol with the styrene-maleic anhydride polymer under either bulk or solvent conditions. The reaction temperature may vary depending upon the solvent used and/or upon the particular resin employed. If no solvent is used, a desirable reaction temperature is about 140° to 175° C. Advantageously, an esterification catalyst such as lithium acetate is also employed.

The following examples are included to further illustrate preparation of the allylic esters of the styrene-maleic anhydride resins of the present invention.

Example I

Mixtures of the styrene-maleic anhydride resin identified in Table II as Resin A and either allyl alcohol or methallyl alcohol together with 0.25% by weight of lithium acetate as a catalyst, were placed in a 1-liter stainless steel autoclave. The autoclave was purged with nitrogen and the mixture heated to 145-165° C. and maintained at this temperature for two hours. The autoclave was dismantled while still near the reaction temperature and the allylic half-ester allowed to cool. It was then ground to a powder, washed thoroughly with water in a Waring Blendor to remove any unreacted allyl alcohol, filtered and dried. The yields of allylic half-esters were quantitative.

Example II

A mixture of styrene-maleic anhydride resins A, B, C, D or E (all identified in Table II below), 2-phenylallyl alcohol and lithium acetate (0.25% by weight), in a 1-liter resin kettle, was purged with nitrogen. The mixture was then heated to 150° C. and maintained at this temperature for four hours with stirring. The product was removed from the kettle while still hot and allowed to solidify. The yield of half-ester was quantitative.

Example III

A mixture of styrene-maleic anhydride resin C of Table II (200 g.), 1-decanol (51 g.) and lithium acetate (1.0 g.) was heated with stirring in a 1-liter resin kettle at 160-170° C. for three hours in a nitrogen atmosphere. Methallyl alcohol (40 g.) was then added and stirring continued at 150-160° C. for 20 hours. The product was removed from the kettle while still hot and allowed to cool.

Analysis of the products of Examples I through III are shown in Table II.

TABLE II

| Product | Styrene-Maleic Anhydride Resin Used | Alcohol for Esterification | | | Acid No. | Molecular Wt. | Iodine No. | Allylic Groups per Molecule [1] | Percent Esterification [2] | Melting Range, deg. |
|---|---|---|---|---|---|---|---|---|---|---|
| | | Allyl | Methallyl | 2-Phenylallyl | | | | | | |
| 1 | A | XX | | | 237 | 761 | 23.8 | 0.7 | 30 | 93-97 |
| 2 | A | XX | | | 191 | 779 | 681 | 2.1 | 85 | 83-88 |
| 3 | A | | XX | | | 862 | 39.5 | 1.3 | 50 | 79-84 |
| 4 | A | | XX | | 210 | 843 | 67.3 | 2.2 | 85 | 74-78 |
| 5 | B | XX | | | 209 | 2,441 | 16.5 | 1.6 | 35 | 125-135 |
| 6 | B | XX | | | 195 | 2,072 | 29.8 | 2.4 | 50 | 123-128 |
| 7 | B | XX | | | 142 | 2,834 | 47.5 | 5.3 | 85 | 115-120 |
| 8 | B | | XX | | 223 | 2,390 | 20.8 | 2.0 | 40 | 125-133 |
| 9 | B | | XX | | 143 | 1,956 | 35.2 | 2.7 | 70 | 103-108 |
| 10 | B | | | X | 131 | | 39.9 | | 85 | 75-79 |
| 11 | C | XX | | | 285 | 2,183 | 17.7 | 1.5 | 30 | 144-148 |
| 12 | C | XX | | | 250 | 2,129 | 35.5 | 3.0 | 50 | 143-148 |
| 13 | C | XX | | | 209 | 2,160 | 42.2 | 3.5 | 60 | 141-147 |
| 14 | C | XX | | | 178 | 2,282 | 61.7 | 5.5 | 85 | 137-143 |
| 15 | C | | XX | | 240 | 2,319 | 21.9 | 2.0 | 40 | 145-151 |
| 16 | C | | XX | | 161 | 1,920 | 433 | 3.3 | 70 | 118-123 |
| 17 | C | | | XX | 151 | | 54.3 | | 85 | 80-86 |
| 18 | D | XX | | | 221 | 1,856 | 79.2 | 5.8 | 70 | 138-145 |
| 19 | D | | XX | | 229 | 1,528 | 68.3 | 4.1 | 50 | 125-134 |
| 20 | D | | | XX | 169 | | 37.6 | | 90 | 110-114 |
| 21 | E | XX | | | 213 | | 33.7 | | ~90 | 95-102 |
| 22 | E | | | XX | 157 | | 9.1 | | ~90 | 38-44 |
| | | Alcohol Combination: | | | | | | | | |
| 23 | C | Allyl, n-Decyl | | | 170 | 2,295 | 19.6 | 1.7 | ~90 | 99-116 |
| 24 | C | Methallyl, n-Decyl | | | 139 | 2,137 | 23.3 | 2.0 | ~90 | 94-110 |
| 25 | A | Methallyl, n-Decyl | | | 166 | 968 | 32.3 | 1.2 | ~90 | 52-68 |
| 26 | D | Methyallyl, n-Decyl | | | 187 | 1,852 | 74.9 | 5.5 | ~90 | 110-124 |

[1] Based on iodine number and molecular weight.
[2] An estimate based on acid number, iodine number and molecular weight and based on half-ester as 100%.
A—Copolymer having a mole ratio of styrene to maleic anhydride of 1:1 and an average molecular weight of 400-700.
B—Copolymer having a mole ratio of styrene to maleic anhydride of 3:1 and an average molecular weight of 1,900.
C—copolymer having a mole ratio of styrene to maleic anhydride of 2:1 and an average molecular weight of 1,700.
D—Copolymer having a mole ratio of styrene to maleic anhydride of 1:1 and an average molecular weight of 1,600-2,000.
E—50% partial ester of Butyl Cellosolve and a SMA copolymer having a mole ratio of styrene to maleic anhydride of 1:1 and an average molecular weight of 1,600-2,000 (for base resin).

The ammonium or amine salts of the allylic ester of the styrene maleic anhydride resin of the invention can be prepared by simple hydrolysis of the polymer resin with water in the presence of a suitable amine or ammonium hydroxide. The hydrolysis can be conducted by making a slurry in distilled water of at least 1 mole of amine or ammonium hydroxide per equivalent of carboxylic acid group in the polymer and heating, if necessary, until hydrolysis is complete. Conveniently the amine or ammonium hydroxide is added to the slurry of polymer resin until essentially all of the resin is dissolved. A final pH adjustment is usually made to bring the solution to a pH of about 7 to 12, preferably 8 to 9. The salts of the invention often have at least about 50% conversion, preferably about 85 to 100% of the carboxyl groups and remaining anhydride groups of the polymer resin to their salt forms. The completely water-soluble salts are preferred, although complete solubility in water is not necessary as long as the salt possesses the desired dispersing properties.

Amines which can be used to form the amine salts of the invention include the water-soluble amines having the general formula:

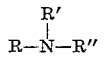

wherein R is a hydrocarbon radical, preferably of 1 to 8 carbon atoms and R' and R'' are hydrogen or R. R can be aliphatic or aryl, preferably alkyl, and can be substituted or unsubstituted with non-interfering substituents, such as hydroxy groups. R, R', and R'' can be similar or dissimilar and if desired, can be oxyalkylated as with ethylene oxide to improve the water solubility of the amines. Thus the amines can be primary, secondary or tertiary amines and include by way of illustrative example, alkyl amines such as methylamine, dimethylamine, trimethylamine, ethylamine, diethylamine, triethylamine, n-propylamine, di-n-propylamine, tri-n-propylamine, di-n-propylethylamine, isobutylamine, di-isobutylamine, tri-isobutylamine, isobutylmethylamine and the like, arylamines such as phenylamine, diphenylamine and triphenylamine; alkylamines such as ethenylamine, di-alkenylamine, triethenylamine, ethenylmethylamine; alkanolamines such as ethanolamine, diethanolamine, trimethylolmethylamine and the like. The preferred amines are the lower alkanolamines. In addition to the primary, secondary and tertiary amines, the water-soluble quaternary ammonium bases derived from ammonium hydroxide, such as tetramethyl ammonium hydroxide and tetraethyl ammonium hydroxide, may also be used to form the amine salts of the invention.

The polymerization systems in which the ammonium or amine salt of the invention is used as the dispersant are those systems wherein polymerization of polymerizable monomers is effected in the presence of a polymerization catalyst, emulsifier or suspending agent and water.

The various polymerizable monomers which are chemically stable under the conditions employed for polymerizations can be employed. The monomer materials are ethylenically unsaturated monomers containing at least one polymerizable $>C{=}C<$ group, usually a terminal ethylenic group ($CH_2{=}C<$). Such monomers include vinyl hydrocarbons, preferably of 2 to 20 carbon atoms as, for instance, mono- and di-alpha olefins such as isobutene, diisobutylene octene, butadiene and isoprene; styrene, alpha-, ortho-, meta- and para-methylstyrenes, the divinylbenzenes, etc., the acrylic type acids, nitriles, amides and esters; the allylic-type carboxylic esters and alcohols; the monovinylpyridines; n-vinyl pyrrolidone, vinylidine monomers; vinyl esters of halogen acids or of carboxylic acids; the alkyl vinyl ethers and the alkyl vinyl ketones.

Some acrylic type compounds may have the structure:

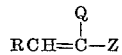

wherein Q is hydrogen, halogen or a hydrocarbon radical, say of 1 to 12 carbon atoms, as for instance, alkyl, alkenyl, cycloalkyl, aryl and aralkyl and Z is selected from —CN, —COOR and

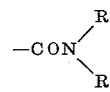

wherein R is hydrogen or a hydrocarbon radical as defined in Q above. Important monomers of this type include acrylonitrile and the ethylacrylates, including the lower alkylmethacrylates. Other acrylic type compounds include the hydroxy-substituted esters of acrylic acids and polyhydric alcohols as for instance, ethylene glycol mono- and di-acrylates.

Allylic-type esters, acids and alcohols include those having the structure:

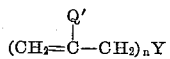

wherein Q' is hydrogen, halogen,

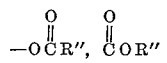

or a hydrocarbon radical of 1 to 12 carbon atoms, preferably alkyl or aryl; $n$ is 1 to 2; Y is hydroxy,

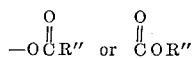

when $n$ is 1 and a diacyloxy radical of a carboxylic acid when $n$ is 2. R'' in the radicals

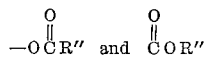

may be hydrogen or a hydrocarbon radical such as an alkyl, alkenyl, cycloalkyl, aryl or aralkyl, usually of 2 to 12 carbon atoms. Representative monomers of this type are di(methallyl)succinate, allyl acetate, diallyl phthalate and dimethyl itaconate.

Monovinylpyridines include vinylpyridines, viz, the 2, 3 and 4-vinylpyridines, and the alkyl-substituted vinylpyridines, e.g., 2-methyl-5-vinylpyridine, 5-ethyl-2-vinylpyridine, 2-methyl-5-vinylpyridine, and the like. N-vinyl monomers include N-vinylpyrrole, N-vinyl carbazole, N-vinylindole, N-vinylsuccinimide and the like.

Vinyl compounds include those having the structure $CH_2{=}CH{-}A$ where A is halogen or an acyloxy radical as for instance vinyl chloride and vinyl acetate. Vinylidine monomers include, for example, vinylidine dichloride, diacetates, dinitriles and the like.

The polymers prepared can be copolymers or terpolymers of 3 or more vinyl compounds. In preparing copolymers it is preferable to select those materials which show a favorable copolymerization reactivity. However, in many instances, monomers which fail to copolymerize can, nevertheless, be converted into an emulsion or suspension of mixed polymers which is extremely stable and of small particle size. For example, the present invention can be employed to prepare emulsions or suspensions from a mixture of styrene and vinyl acetate, although it is well known that these monomers do not undergo extensive copolymerization.

The polymerization catalyst commonly employed in emulsion and suspension polymerizations are materials which are capable of liberating free radicals under the conditions employed for polymerization. Typical catalysts which may be employed are potassium persulfate, sodium persulfate, ammonium persulfate, hydrogen peroxide, tertiary butyl hydroperoxide, cumene hydroperoxide, benzoyl peroxide, azobisisobutyronitrile, lauroyl peroxide, isopropyl peroxydicarbonate, tertiary butylperoxypivalate and the like. Redox catalysts may also be employed, especially when polymerization is carried out at lower temperatures. Typical redox catalysts which can be used are the persulfate bisulfite systems such as potassium persulfate-sodium bisulfite, tertiary butyl hydroperoxide-sodium formaldehyde sulfoxylate, as well as other redox systems which are known in the art.

The polymerization temperature is a function of the catalyst or catalyst system employed in the preparation of the polymer dispersion. The usual operating range is about 30–60° C., although it may be desirable to operate in the range of about 0–100° C. The polymerization is usually carried out at atmospheric pressure or autogenous pressure, although superatmospheric pressure may be required if it is desired to liquefy gaseous monomers.

The amount of the ammonium or amine salt of the allylic ester of the styrene maleic anhydride polymer employed in the polymerization will vary depending upon the other monomer or monomers selected and the properties desired in the final product. Frequently, however, about 0.1 to 60% of the amine or ammonium salt is used, based on the total monomers. Accessory emulsifiers or protective colloids are not necessary to attain stability in many cases, especially below 30% solids level. They are useful, however, to impart additional stability at a higher solids content. The type of accessory emulsifier or suspending agents may vary widely and includes most of the commercially available cationic, nonionic and anionic materials. The preferred accessory emulsifiers are the nonionic type such as oxyalkylated phenol and oxyalkylated fatty alcohols. Other useful types are the products obtained by oxyalkylation of substituted phenols, e.g., the condensation products of ethlyene oxide with octyl and nonyl phenols. When employed the accessory emulsifiers are usually present in an amount of about 0.1 to 5% by weight based on the monomers. Suspending agents which can be employed include carboxymethyl cellulose, hydroxyethyl cellulose, polyvinyl alcohol and related materials.

Many techniques may be employed for preparing polymer emulsions or suspensions using the ammonium or amine salts of the styrene maleic allylic esters as one of the monomers in the polymerization. When preparing a large number of polymer emulsions or suspensions on a small scale, it is convenient to conduct the polymerization reactions in pressure bottles which are charged with the ingredients of the polymerization recipe and heated in a thermostated, rotating water bath for extended time intervals. When conducting the polymerization in pressure bottles, the ingredients of the aqueous and nonaqueous charge are mixed instantaneously in the pressure bottle which is sealed under nitrogen, capped and placed in the polymerization bath. In preparing the dispersions of the present invention, the aqueous solutions of the ammonium or amine salts of the resin are added as part of the aqueous charge. The accessory emulsifiers or suspending agent and catalysts are then added, followed by instantaneous or incremental addition of the monomer or monomer mixture. When conducting larger scale reactions, the polymerization emulsions or suspensions can be prepared using a batch process or continuous process. The batch reactions are conducted by methods including (1) instantaneous monomer addition to the nonaqueous charge; (2) incremental monomer addition with some initial pre-mixing of monomer and aqueous charge; (3) incremental monomer addition with no pre-mixing of aqueous and nonaqueous charge; and (4) in the case of polymer emulsions, the emulsion addition technique in which aqueous and nonaqueous charge are pre-emulsified and added incrementally to the batch reactor.

In continuous polymerization operations the aqueous and nonaqueous charge are added separately and incrementally (by means of a metering pump or other suitable metering device) to the polymerization reactor while polymer emulsions or suspension is removed continuously. In some cases the aqueous and nonaqueous charge, including or excluding the catalysts, are pre-emulsified and added continuously to the reactor, during which time initiator may also be fed to the reactor from a separate metering system.

Residence times in batch or continuous reactors are usually in the order of one hour to 24 hours depending on polymerization temperature, monomer structures, monomer concentration, catalyst concentration, emulsifier or suspending agent concentration and other factors usually associated with rates of polymerization reactions in emulsion or suspension systems.

The following examples are included to further illustrate the present invention:

Example IV

Styrene and the ammonium salt of an allylic ester of styrene maleic anhydride C were polymerized employing the recipe shown below. The allylic ester is that identified in Table II as product 12.

| Recipe: | Grams |
|---|---|
| Styrene-maleic anhydride allyl ester | 7.5 |
| Styrene | 50.0 |
| Potassium persulfate | 0.2 |
| Sodium bisulfite | 0.1 |
| Water and conc. aqueous ammonia | 104.0 |
| Igepal CO–990 [1] | 1.5 |
| Igepal CO–630 [1] | 1.5 |

[1] Oxyalkylated nonylphenols as accessory surfactants.

The polymerization was conducted as follows:

The allylic ester of the styrene-maleic anhydride was dissolved in dilute aqueous ammonia and the pH was adjusted to 8–9. The styrene and accessory surfactants are added along with the rest of the water to give a 37% solids. The mixture, in a citrate bottle was purged with nitrogen and then a solution of the potassium persulfate-sodium bisulfite initiators added. The bottle was immediately sealed and agitation of the mixture begun. The mixture was shaken in a Laundero-meter at 50° C. for 16 hours.

The emulsion produced was found to be very stable as shown by the fact that the emulsion was stable for at least one week. The emulsion stability was rated according to the procedure established by G. Greth and J. E. Wilson, J. App. Poly., Sci. 5, 135–148 which is as follows:

| Definition: | Rating |
|---|---|
| Lumps formed within half hour after start of polymerization | 0 |
| Lumps formed within one hour after start of polymerization | 1 |
| Lumps formed within two hours after start of polymerization | 2 |
| Excessive pre-floc formation | 3 |
| Pre-floc formation | 4 |
| Very little pre-floc formation | 5 |
| Stable for less than one day | 6 |
| Stable for one day | 7 |
| Stable for three days | 8 |
| Stable for one week | 9 |
| Stable for more than one week | 10 |

The copolymer was precipitated by slow addition of the emulsion to 9% hydrochloric acid (200 ml.). The precipitate was filtered immediately, washed thoroughly with water and dried in a vacuum oven. The copolymer was then washed with a 1:1 benzene-methanol mixture (600 ml.) to remove any reacted styrene-maleic anhydride allyl ester. The copolymer was allowed to stand in contact with the solvent mixture for 1 hour and then filtered. The product was washed three times in this manner and finally dried in a vacuum oven. The infrared spectrum of the copolymer had absorption at $5.6\mu$ (anhydride), $5.85\mu$ (carboxylic acid) and $5.72\mu$ (ester).

Example V

A number of emulsion polymerizations were conducted employing the ammonium salts of the esters of styrene-maleic anhydride resins, identified in Table III below, as one of the monomers. The polymerization was conducted according to the general procedure of Example I. The other monomers employed in the polymerization and the results are also shown in the table.

TABLE III

[All the emulsion polymerizations were performed at 50° C. using potassium persulfate (0.2 part)—sodium bisulfite (0.1 part) initiator]

| SMA Resins [1] | | | | Other Monomers | | Accessory Surfactant, parts | Percent Solids | Stability Rating |
|---|---|---|---|---|---|---|---|---|
| Percent half-ester | Alcohol | Base Resin | Parts | Styrene, parts | Ethyl Acrylate, parts | | | |
| 85 | Allyl | A | 7.5 | 45.0 | 5.0 | Igepal CO-990,[2] 1.5 / Igepal CO-630,[2] 1.5 | 37 | 10 |
| 70 | do | B | 7.5 | 45.0 | 5.0 | Igepal CO-990, 1.5 / Igepal CO-630, 1.5 | 37 | 10 |
| 60 | do | C | 7.5 | 45.0 | [3] 5.0 | Igepal CO-990, 1.5 / Igepal CO-630, 1.5 | 36 | 10 |
| 60 | do | C | 7.5 | 45.0 | [4] 5.0 | Igepal CO-990, 1.5 / Igepal CO-630, 1.5 | 36 | 10 |
| 60 | do | C | 7.5 | 45.0 | [5] 5.0 | Igepal CO-990, 1.5 / Igepal CO-630, 1.5 | 36 | 10 |

[1] Dissolved in dilute aqueous ammonia adjusted to pH 8–9.
[2] Oxyalkylated nonylphenols.
[3] 2-ethylhexyl, parts acrylate.
[4] Butadiene, parts.
[5] Acrylonitrile, parts.

Similar stable emulsions can be obtained by employing in the polymerization of Example IV, the following salts instead of the ammonium salt of Example IV:

Example VI—Ethanolamine salt of the allylic ester of the styrene-maleic anhydride resin of Example IV.

Example VII—Methylpropylethanolamine salt of the styrene-maleic anhydride resin of Example IV.

It is claimed:

1. In the polymerization of at least two ethylenically unsaturated monomers, each containing a polymerizable $$>C=C<$$

group at a temperature of about 0 to 100° C. in the presence of a polymerization catalyst, water and a dispersing agent, the improvement which comprises employing as one of the monomers about 0.1 to 60%, based on total monomers, of a water-soluble salt selected from the group consisting of the water-soluble amine and ammonium salts of an allylic ester of a polymer of styrene and maleic anhydride having about 1 to 4 moles of styrene per mole of maleic anhydride and an average molecular weight of at least about 400, said allylic ester being an about 2 to 200% half-ester of an allylic monohydric alcohol of 3 to 30 carbon atoms.

2. The improvement of claim 1 wherein the polymer of styrene and maleic anhydride has a molecular weight of about 400 to 15,000.

3. In the polymerization of styrene with other ethylenically unsaturated monomer containing at least one polymerizable $>C=C<$ group at a temperature of about 0 to 100° C. in the presence of a polymerization catalyst, water and a dispersing agent, the improvement which comprises employing as other ethylenically unsaturated monomer about 0.1 to 60%, based on total monomers, of a water-soluble salt selected from the group consisting of the water-soluble amine and ammonium salts of an allylic ester of a polymer of styrene and maleic anhydride having about 1 to 4 moles of styrene per mole of maleic anhydride and an average molecular weight of at least about 400, said allylic ester being an about 2 to 200% half-ester of an allylic monohydric alcohol of 3 to 30 carbon atoms.

4. The improvement of claim 3 wherein the polymer of styrene and maleic anhydride has a molecular weight of about 400 to 15,000.

5. The improvement of claim 4 wherein said allylic ester is an about 20 to 90% half-ester.

6. The improvement of claim 5 wherein the polymer of styrene and maleic anhydride has about 1 to 3 moles of styrene per mole of maleic anhydride.

7. The improvement of claim 6 wherein the polymerizable $>C=C<$ group is a terminal ethylenic group corresponding to the formula $CH_2=C<$.

8. The improvement of claim 7 wherein the allylic monohydric alcohol has 3 to 15 carbon atoms.

9. The improvement of claim 7 wherein the allylic monohydric alcohol is allyl alcohol.

10. The improvement of claim 7 wherein the allylic monohydric alcohol is methallyl alcohol.

11. The improvement of claim 7 wherein the allylic monohydric alcohol is 2-phenylallyl alcohol.

12. In the polymerization of styrene with a lower alkyl acrylate and other ethylenically unsaturated monomer containing at least one polymerizable $$>C=C<$$

group at a temperature of about 0 to 100° C. in the presence of a polymerization catalyst, water and a dispersing agent, the improvement which comprises employing as other ethylenically unsaturated monomer about 0.1 to 60%, based on total monomers, of a water-soluble salt selected from the group consisting of the water-soluble amine and ammonium salts of an allylic ester of a polymer of styrene and maleic anhydride having about 1 to 4 moles of styrene per mole of maleic anhydride and an average molecular weight of at least about 400, said allylic ester being an about 2–200% half-ester of an allylic monohydric alcohol of 3 to 30 carbon atoms.

13. The improvement of claim 12 wherein the polymer of styrene and maleic anhydride has a molecular weight of about 400 to 15,000.

14. The improvement of claim 13 wherein the polymer of styrene and maleic anhydride has about 1 to 3 moles of styrene per mole of maleic anhydride.

15. The improvement of claim 14 wherein the allylic monohydric alcohol has 3 to 15 carbon atoms.

16. The improvement of claim 14 wherein the allylic monohydric alcohol is allyl alcohol.

17. The improvement of claim 14 wherein the allylic monohydric alcohol is methallyl alcohol.

18. The improvement of claim 14 wherein the allylic monohydric alcohol is 2-phenylallyl alcohol.

References Cited

UNITED STATES PATENTS

| 2,977,334 | 3/1961 | Zopf | 260—27 |
| 2,961,421 | 11/1960 | Cohen et al. | 260—885 |

FOREIGN PATENTS

| 856,320 | 12/1960 | Great Britain. |
| 861,871 | 3/1961 | Great Britain. |

GEORGE F. LESMES, *Primary Examiner.*

MURRAY TILLMAN, *Examiner.*

J. T. GOOLKASIAN, *Assistant Examiner.*